United States Patent [19]

Fick et al.

[11] Patent Number: 4,814,138

[45] Date of Patent: Mar. 21, 1989

[54] METHOD FOR REPAIRING A NUCLEAR REACTOR FUEL ASSEMBLY AND A REPLACEMENT ROD FOR PERFORMING THE METHOD

[75] Inventors: Peter Fick; Klaus Knecht, both of Erlanger, Fed. Rep. of Germany

[73] Assignee: Siemens Aktiengesellschaft, Berlin and Munich, Fed. Rep. of Germany

[21] Appl. No.: 68,841

[22] Filed: Jul. 1, 1987

[30] Foreign Application Priority Data

Jul. 8, 1986 [DE] Fed. Rep. of Germany ....... 3622852

[51] Int. Cl.$^4$ .......................... G21C 3/12; G21C 3/32
[52] U.S. Cl. ..................................... 376/463; 376/446
[58] Field of Search ............... 376/446, 453, 454, 449, 376/364, 463, 447

[56] References Cited

U.S. PATENT DOCUMENTS

| | | | |
|---|---|---|---|
| 3,607,639 | 9/1971 | Van Santen et al. | 376/446 |
| 4,292,130 | 9/1981 | Viaud et al. | 376/446 |
| 4,336,103 | 6/1982 | Kätscher et al. | 376/245 |
| 4,427,622 | 1/1984 | Knecht et al. | 376/446 |
| 4,489,038 | 12/1984 | Nylund | 376/446 |
| 4,550,941 | 11/1985 | Veronosi et al. | 376/260 |
| 4,599,213 | 7/1986 | Leclercq et al. | 376/446 |
| 4,692,303 | 9/1987 | Osborne | 376/446 |
| 4,697,322 | 10/1987 | Knecht et al. | 376/245 |

FOREIGN PATENT DOCUMENTS

| | | |
|---|---|---|
| 1639307 | 2/1971 | Fed. Rep. of Germany . |
| 2635501 | 2/1978 | Fed. Rep. of Germany . |
| 3202238 | 9/1982 | Fed. Rep. of Germany . |
| 2360963 | 3/1978 | France . |
| 2477754 | 9/1981 | France . |
| 2524684 | 10/1983 | France . |

*Primary Examiner*—Deborah L. Kyle
*Assistant Examiner*—Daniel Wasil
*Attorney, Agent, or Firm*—Herbert L. Lerner; Laurence A. Greenberg

[57] ABSTRACT

In a nuclear reactor fuel assembly having a fuel rod filled with nuclear fuel retained in a gap formed in a lattice-like spacer by a spring disposed in the gap, the fuel assembly is repaired by replacing the fuel rod with a replacement rod and the replacement rod is retained in the gap of the spacer with a retaining spring.

2 Claims, 4 Drawing Sheets

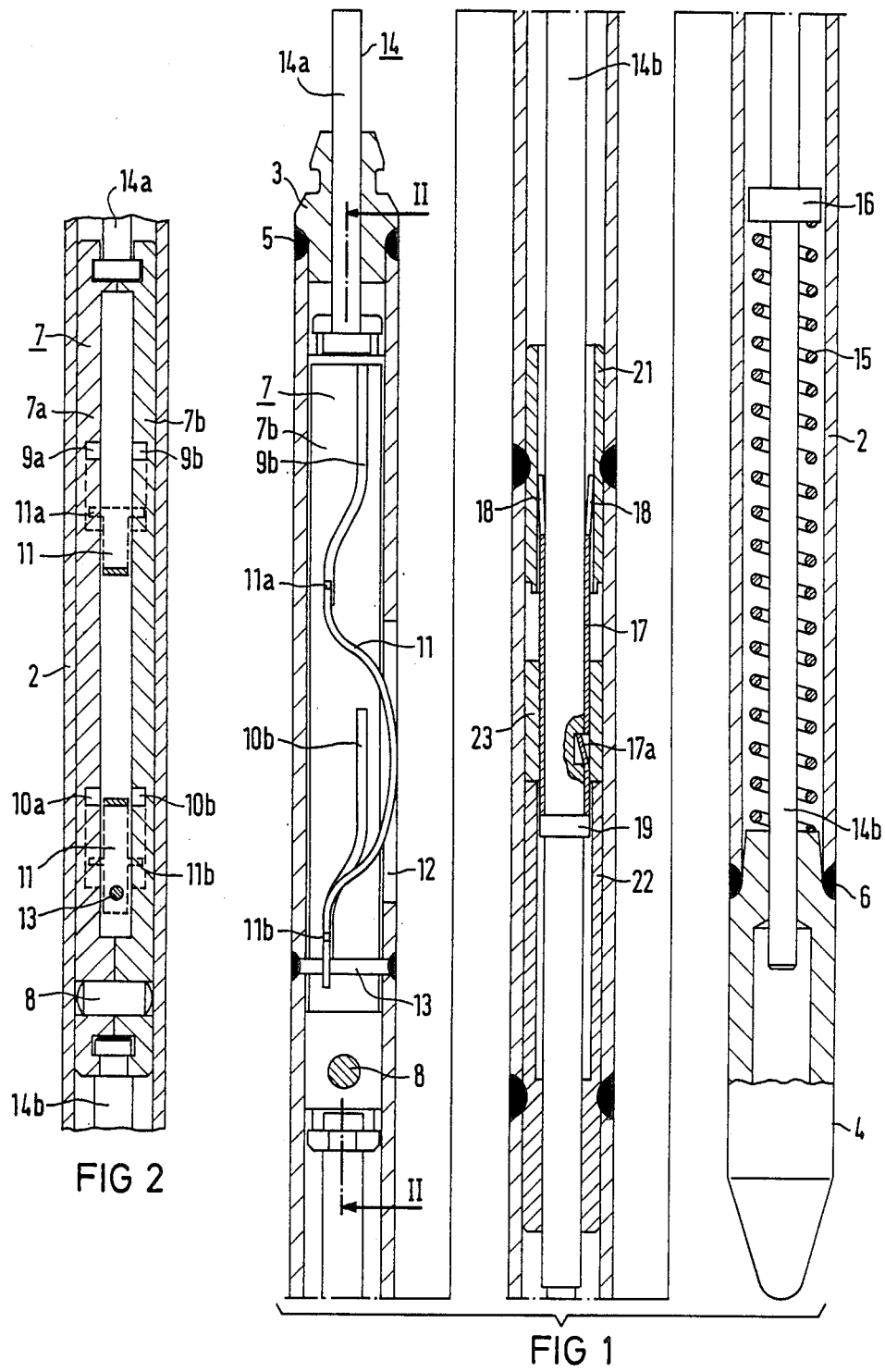

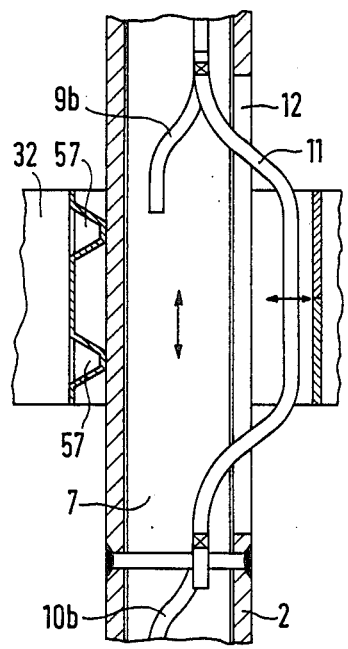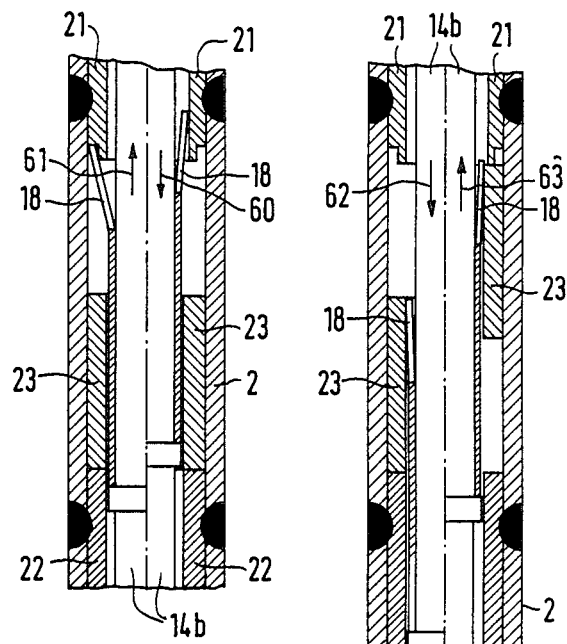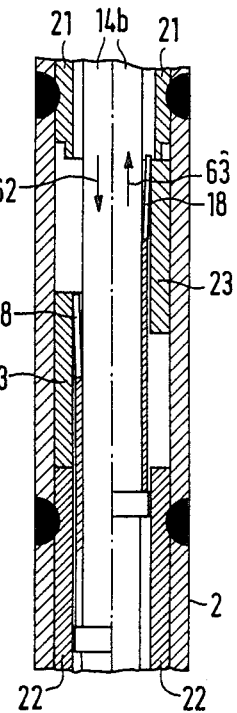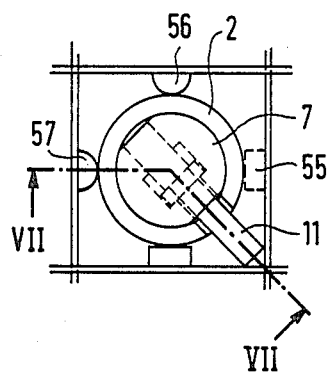

METHOD FOR REPAIRING A NUCLEAR REACTOR FUEL ASSEMBLY AND A REPLACEMENT ROD FOR PERFORMING THE METHOD

The invention relates to a method for repairing a nuclear reactor fuel assembly by replacing a fuel rod of the fuel assembly filled with nuclear fuel and retained in a force-locking manner in a gap formed in a lattice-like spacer by means of a spring disposed in the gap, and a replacement rod for performing the method.

A method of this type is known from German Published, Non-Prosecuted Application No. DE-OS 26 35 501. In this known method, a defective and irradiated fuel rod filled with nuclear fuel is removed from the nuclear reactor fuel assembly and replaced with a new replacement rod filled with nuclear fuel, which is inserted with a fuel rod changing tool into the gap in the lattice-like spacer in the nuclear reactor fuel assembly in which the defective fuel rod was located.

However, this method cannot be used if the spring located in that particular gap of the lattice-like spacer has broken off or no longer has adequate spring force. In that case, neither the fuel rod originally located in that gap nor a replacement rod can be securely retained in the gap of the spacer of the nuclear reactor fuel assembly.

However, as a rule the gap of the spacer of the nuclear reactor fuel assembly in which the spring for the force-locking retention of a fuel rod has broken or become unusable cannot merely be left unoccupied, because in the nuclear reactor, the space for the fuel rod missing from the nuclear reactor fuel assembly is filled with water, which changes the moderating action of the water in the nuclear reactor upon the neutrons located there. Furthermore, the missing fuel rod causes a change in the speed of the water flowing as coolant through the nuclear reactor, so that oscillation of the fuel rods still located in the nuclear reactor fuel assembly and consequent further damage to this fuel assembly cannot be precluded.

In order to utilize the still considerable burnup potential present in the irradiated fuel rods of a nuclear reactor fuel assembly having a broken spring and located in a gap of the spacer, it is possible to move all of the irradiated fuel rods from the nuclear reactor fuel assembly and shift them into a new fuel assembly skeleton, thereby forming another fuel assembly. The skeleton is substantially formed of new spacers as well as a head and a base or foot piece, which are firmly connected to one another by means of control removal tubes which engage gaps in the spacers.

However, this method is very time-consuming and accordingly entails high repair costs. A further factor is waste disposal costs for the irradiated skeleton of the old nuclear reactor fuel assembly.

It is accordingly an object of the invention to provide a method for repairing a nuclear reactor fuel assembly and a replacement rod for performing the method, which overcomes the hereinafore-mentioned disadvantages of the heretoforeknown methods and devices of this general type and which makes it simpler and less expensive to repair a nuclear reactor fuel assembly in which the spring for the force-locking retention of a fuel rod in a gap of the spacer is unusable.

With the foregoing and other objects in view there is provided, in accordance with the invention, in a nuclear reactor fuel assembly having a fuel rod filled with nuclear fuel retained in a gap formed in a lattice-like spacer by means of a spring disposed in the gap, a method for repairing the fuel assembly, which comprises replacing the fuel rod with a replacement rod, and retaining the replacement rod in the gap of the spacer with a retaining spring.

In accordance with another mode of the invention, there is provided a method which comprises placing the retaining spring in a corner of the gap.

The repair costs for the fuel assembly remain approximately the same as in the prior art repair method because of the use of the replacement rod. Nevertheless, the nuclear reactor fuel assembly does not have a vacant space where the fuel rod replaced by the replacement rod was located.

With the objects of the invention in view, in a nuclear reactor fuel assembly having a fuel rod filled with nuclear fuel retained in a gap formed in a lattice-like spacer by means of a spring disposed in the gap, there is also provided a replacement rod for replacing the fuel rod, comprising a cladding tube having a shell with an opening formed therein, a sliding body movable inside the cladding tube in two longitudinal directions of the cladding tube, a slotted link disposed on the sliding body, a retaining spring guided in the slotted link and extending outwardly through the opening formed in the shell, and a locking device associated with the sliding body for displacing the spring radially outwardly upon movement of the sliding body in one longitudinal direction of the cladding tube so as to retain the replacement rod in the gap formed in the spacer and for displacing the spring radially inwardly upon movement of the sliding body in the other longitudinal direction of the cladding tube so as to release the replacement rod from the gap formed in the spacer.

In accordance with a concomitant feature of the invention, the cladding tube has a protruding locking shoulder on the inside thereof, and there is provided an actuating rod with an outer shell surface displaceable inside the cladding tube for moving the sliding body, the locking device being in the form of a tongue spring with a given thickness and length disposed on the outer shell surface of the actuating rod, the tongue spring having two ends extending in the longitudinal direction of the actuating rod, one of the ends of the tongue spring facing in the direction of movement of the sliding body being secured on the actuating rod for expulsion of the retaining spring and the other of the ends of the tongue spring being spaced from the outer shell surface of the actuating rod for gripping the protruding locking shoulder from behind, a clamping sheath with a given length disposed inside the cladding tube, a protruding stop shoulder for the clamping sheath disposed inside the cladding tube and spaced apart from the locking shoulder by a given distance in the direction of movement of the sliding body for expulsion of the retaining spring, the clamping sheath being coaxially displaceable in the longitudinal direction of the cladding tube between the locking shoulder and the stop shoulder, the clamping sheath having an inner shell surface protruding beyond the locking shoulder in radial direction and being radially spaced apart from the actuating rod by a distance greater than the given thickness of the tongue spring, and the given distance between the locking shoulder and the stop shoulder being greater than the sum of the given length of the clamping sheath and the given length of the tongue spring in the longitudinal direction of the actuating rod.

Other features which are considered as characteristic for the invention are set forth in the appended claims.

Although the invention is illustrated and described herein as embodied in a method for repairing a nuclear reactor fuel assembly and a replacement rod for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a diagrammatic, partly broken-away, longitudinal-sectional view of a replacement rod according to the invention, which is divided into three sections;

FIG. 2 is a fragmentary, longitudinal-sectional view taken at right angles to the longitudinal section of FIG. 1, between two arrows II—II in FIG. 1;

FIG. 7 is a fragmentary, longitudinal-sectional view taken along the line VII—VII in FIG. 8 in the direction of the arrows, showing a portion of the replacement rod of FIG. 6 that is located in the gap of the spacer;

FIG. 8 is a top-plan view of the gap of the spacer with the replacement rod of FIG. 7; and FIGS. 9 and 10 are fragmentary longitudinal-sectional views of the replacement rod according to FIG. 1.

Figure 3:
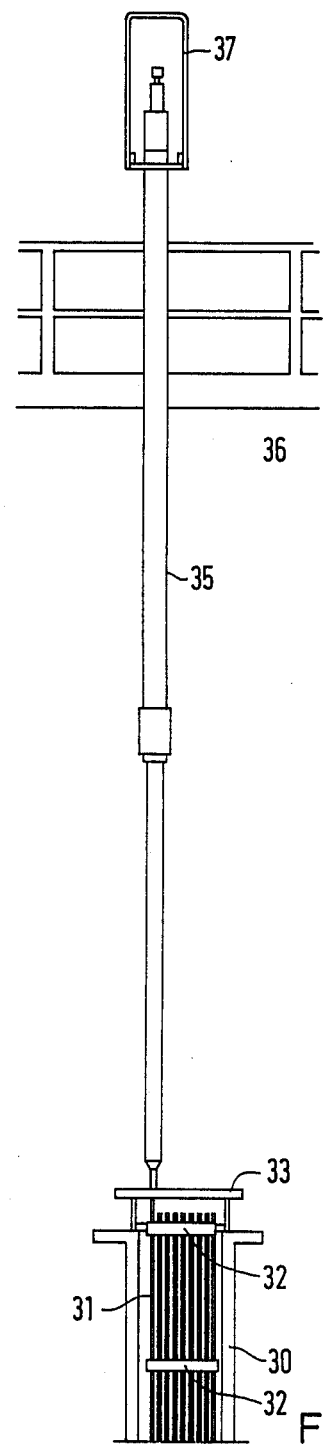
FIG. 3 is a side-elevational view of an actuating tool for a replacement rod in accordance with FIGS. 1 and 2 in a pool of water.

Referring now to the figures of the drawings in detail and first, particularly, to FIGS. 1 and 2 thereof, there is seen a replacement rod which has a cladding tube 2 formed of a zirconium alloy, that is closed off at each end with respective end caps 3 and 4. The end caps 3 and 4 are welded to the jacket of the cladding tube 2 at weld points 5 and 6.

Disposed in the cladding tube 2 is a sliding body 7 extending in the longitudinal direction of the cladding tube 2. The sliding body 7 is formed of two halves 7a and 7b which are held together by a cross pin 8.

The long or longitudinal sides of the halves 7a and 7b facing one another have slotted links or detents 9a, 10a and 9b, 10b. The slotted links 9a and 10a of the half 7a are spaced apart from one another in the longitudinal direction of the cladding tube 2. The same applies for the slotted links 9b and 10b of the half 7b.

A retaining spring 11 formed of a U-shaped leaf spring is disposed between the two halves 7a and 7b and each end is in the form of a respective cross member 11a, 11b. The cross member 11a engages the slotted links 9a and 9b, while the cross member 11b engages the slotted links 10a and 10b. The jacket of the cladding tube 2 is provided with an opening 12, in which the throat or bow of the retaining spring 11 formed of a U-shaped leaf spring can be engaged, so as to extend to the outside.

A cross pin 13 is disposed between the two halves 7a and 7b, welded firmly to the jacket of the cladding tube 2 and guided with play through one end of the retaining spring 11. Thus the retaining spring 11 is fixed in the longitudinal direction of the cladding tube 2 by means of the cross pin 13.

The sliding body 7 is provided with a two-part actuating rod 14 which is coaxial with the cladding tube 2. One part 14a of the actuating rod 14 is engaged in an opening in the end cap 3 of the replacement rod and is attached to one end of the sliding body 7. The other part 14b of the actuating rod 14 is engaged in an opening in the end cap 4 of the replacement rod and is attached to the other end of the sliding body 7. The actuating rod 14 is displaceable back and forth in the longitudinal direction of the cladding tube in the openings in the end caps 3 and 4. A helical spring 15 which is a compression spring seated on the part 14b of the actuating rod 14, has one end supported on the end cap 4 and another end supported on a support body 16 that is rigidly connected to the part 14b of the actuating rod 14.

A steel sheath 17 is seated on the part 14b of the actuating rod 14 approximately midway between the support body 16 and the sliding body 7. The steel sheath rests on a retaining body 19 on the part 14b of the actuating rod 14 and is fixedly locked in detent fashion with a tongue 17a in the part 14b.

Two tongue springs 18 in the form of locking devices are disposed on the end of the steel sheath 17 facing the sliding body 7 and the part 14a of the actuating rod 14 guided in the end cap 3. The two tongue springs 18 extend in the longitudinal direction of the actuating rod 14 and of the cladding tube 2, they are both the same length and are spaced apart from one another by an angle of 180°. Thus the ends of the tongue springs 18 facing the end cap 4 are secured on the part 14b of the actuating rod 14, while the other ends of the tongue springs 18 facing the end cap 3 extending in the longitudinal direction of the cladding tube 2 tend to stand away from the shell surface of the part 14b of the actuating rod 14.

Two sheaths 21 and 22 of a zirconium alloy are mutually spaced apart on the inside of the cladding tube 2 and firmly welded coaxially with the cladding tube 2. The part 14b of the actuating rod 14 is guided through the sheaths 21, 22. The sheath 21 at the end of the cladding tube 2 having the end cap 3 forms a locking shoulder protruding inward on the cladding tube 2, for the tongue springs representing the locking device. The tongue springs are capable of gripping the end of the sheath 21 facing the end cap 4, from behind.

The sheath 22 forms a stop shoulder protruding inward from the cladding tube 2, for a clamping sheath 23 of a zirconium alloy, which is disposed coaxially between the sheaths 21 and 22 in such a way that it is displaceable back and forth in the longitudinal direction of the cladding tube 2 and is guided by the part 14b of the actuating rod 14 having the steel sheath 17.

The inner shell surface of the clamping sheath 23 protrudes beyond the inner shell surface of the sheath 21 and hence beyond the locking shoulder associated with the tongue springs 18, in the radial direction. On the other hand, the inner shell surface of the clamping sheath 23 is also radially spaced apart from the part 14b of the actuating rod 14, by a distance somewhat greater than the thickness of the steel sheath 17 and the tongue springs 18. Furthermore, the distance by which the sheaths 21 and 22 forming the locking shoulder and the stop shoulder are spaced apart from one another in the longitudinal direction of the cladding tube 2 is greater than the sum of the length of the clamping sheath 23 and the length of the tongue springs 18 in the longitudinal direction of the actuating rod 14.

FIG. 3 shows a holder basket 30 which is located under water in a fuel assembly or spent fuel pit. A nuclear reactor fuel assembly 31 is located in the holder basket with its base end facing up. The base piece of the fuel assembly has been removed from the base end. An irradiated fuel rod has also been removed from the fuel assembly 31 through gaps mutually aligned in spacers 32, using a fuel rod changing tool shown in German Published, Non-Prosecuted Application No. 26 35 501, because a spring that is intended for the force-locking retention of the fuel rod has broken off in the gap of one of the spacers 32. A force-locking connection is one which connects two elements together by force external to the elements, as opposed to a form-locking connection which is provided by the shapes of the elements themselves. A centering plate 33 has been attached on the holder basket 30 above the base end of the fuel assembly and a replacement rod shown in FIGS. 1 and 2 has been inserted through the centering plate into the empty aligned gaps of the spacers 32 of the nuclear reactor fuel assembly 31, using the fuel rod changing tool of German Published, Non-Prosecuted Application No. 26 35 501.

An operator on a bridge 36 above the fuel assembly pit positions the replacement rod accurately in the nuclear reactor fuel assembly 31 with an actuating tool 35 shown in FIG. 3. The actuating tool 35 engages a suitable centering opening in the centering plate 33 and is suspended from a non-illustrated crane. The replacement rod is finally retained in a force-locking manner in the gap of the particular spacer 32 having the broken spring.

Figure 6:
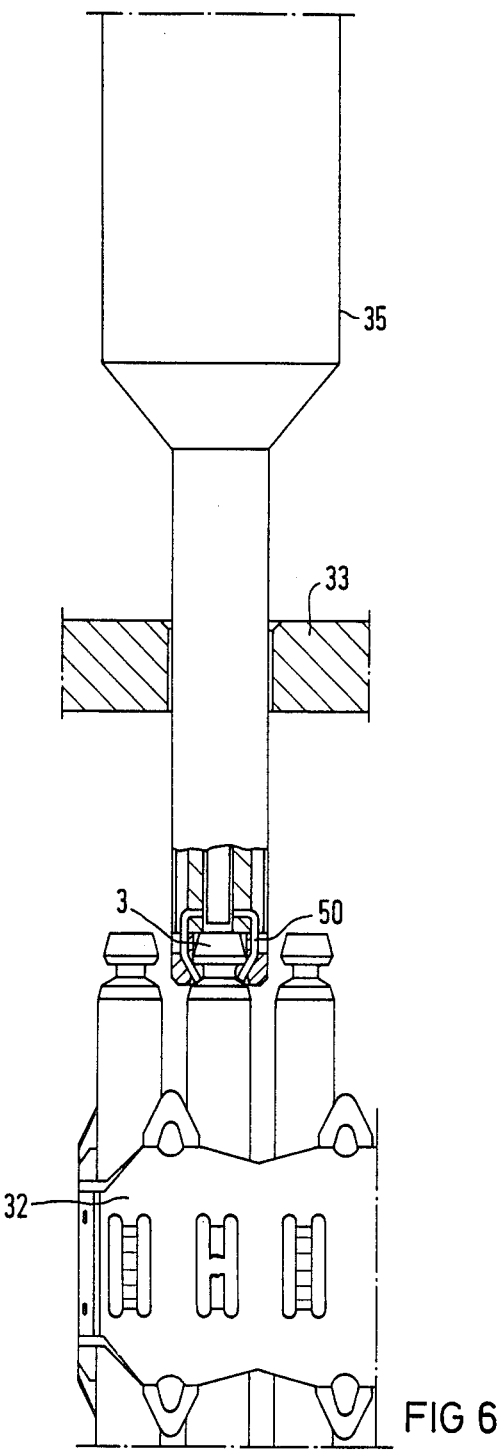
FIG. 6 is a partly broken-away side-elevational view of the actuating tool of FIGS. 4 and 5 with a replacement rod that is disposed in a spacer of a nuclear reactor fuel assembly.
Figures 4, 5:
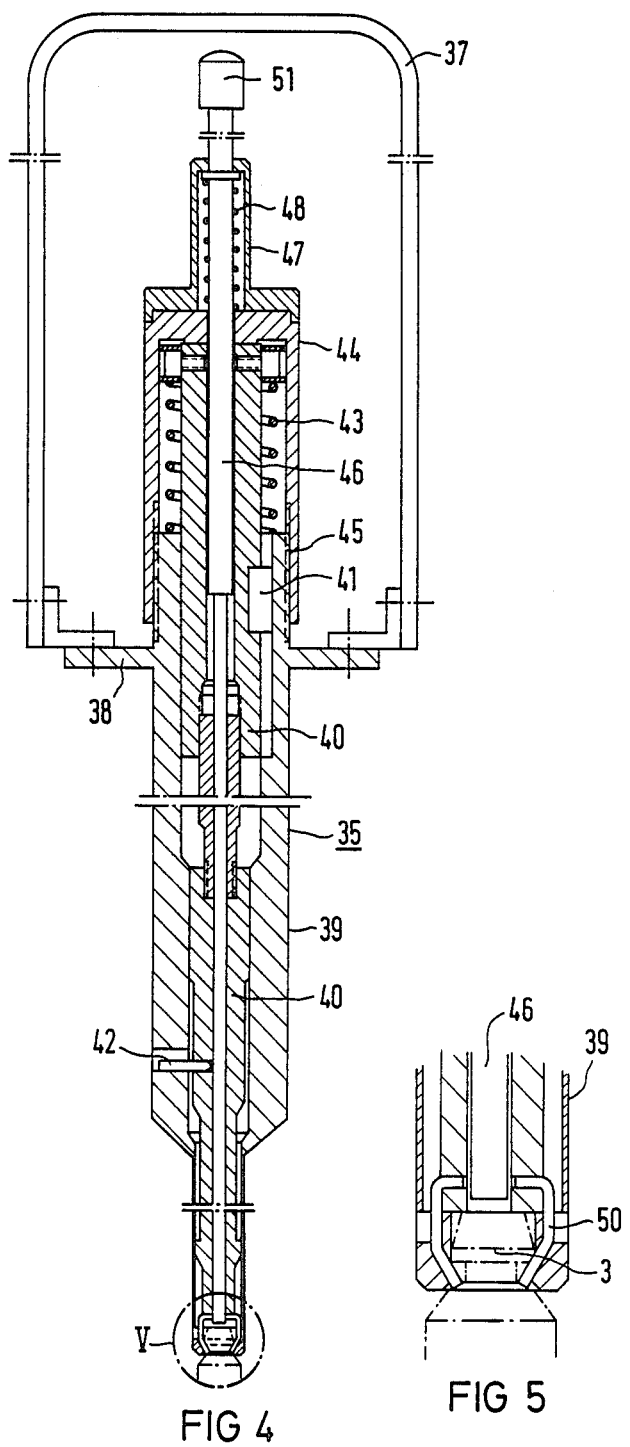
FIG. 4 is a longitudinal-sectional view of the actuating tool of FIG. 3.
FIG. 5 is an enlarged view of the portion V of the actuating tool of FIG. 4.

As FIGS. 4–6 show, the actuating tool 35 has a bracket 37 on the upper end thereof, which is engaged by the nonillustrated crane. The bracket 37 is firmly screwed to a flange 38 which is located on the outer shell surface of an elongated base body 39. Coaxially disposed in the base body 39 is an elongated adjusting body 40, which is displaceable with respect to the base body 39 in the direction of the longitudinal axis. The elongated adjusting body 40 is secured against rotation about the longitudinal axis by a guide body 41 in the base body 39 and is provided with a transversely disposed stop pin 42, which limits the mobility of the adjusting body 40 in the longitudinal direction. A restoring spring in the form of a helical spring 43 is seated on the upper end of the adjusting body 40. The restoring spring is supported as a compression spring with one end on the base body 39 and with the other end on the adjusting body 40. The end of the adjusting body 40 having the restoring spring 43 is located inside a union nut 44. A thread 45 of the union nut 44 engages the base body 39 and the end of the adjusting body 40 rests on the bottom of the union nut 44.

A pressure rod 46 which is displaceable in the longitudinal direction with respect to the adjusting body 40 is guided longitudinally by the adjusting body 40 coaxially with the adjusting body. The pressure rod 46 extends to the outside through an opening 47 engaged by the rod in the bottom of the union nut 44. A helical spring 48 acting as a restoring spring is seated on the pressure rod 46 inside the opening 47. The helical spring 48 is supported as a compression spring with one end on the union nut 44 and the other end on the pressure rod 46.

As shown particularly clearly in FIG. 5, a two-part engaging bracket 50 for gripping the mushroom-shaped end-cap 3 of the replacement rod in the nuclear reactor fuel assembly 31 from behind, is disposed at the other end of the adjusting body 40. By turning the union nut 44 in one direction of rotation or the other under the influence of the restoring spring 43, the adjusting body 40 can be moved in the axial direction toward the end cap 3 for engaging it or away from the end cap 3 for releasing it, so that the two prestressed ends of the engagement bracket 50 spread apart.

By displacing the pressure rod 46 in the axial direction toward the end cap 3 of the replacement rod, the actuating rod 14 can be pushed in the axial direction into the interior of the replacement rod, once the end cap 3 has been firmly engaged by the engaging bracket 50 by suitably turning the union nut 44.

In the configuration shown on a larger scale in FIG. 6, in which the actuating tool 35 passes through and engages the centering plate 33 and the retaining bracket 50 firmly holds the end cap 3 of the replacement rod inserted into the spacers 32 of the fuel assembly 31, the pressure rod 46 is displaced toward the end cap 3 of the replacement rod at the handle 51 on the upper end of the pressure rod. In this way, the actuating rod 14 along with the sliding body 7 is also pushed into the cladding tube 2 of the replacement rod, and under the influence of the slotted links 9a, 9b and 10a, 10b the retaining spring 11 is pushed to the outside through the opening 12 in the cladding tube 2. As FIGS. 7 and 8 show, during this process the retaining spring 11 is advantageously disposed in a corner of a gap or opening in the spacer 32 in which a retaining spring 55, for example, that is located in the middle of one side of the gap, has broken. With the aid of four knobs 56 and 57, each two of which are located on a respective straight line parallel to the longitudinal direction of the gap in the middle of two adjacent sides of a gap, the replacement rod is then retained in the gap in a particularly stable and force-locking manner.

In the right half of FIG. 9, an arrow 60 indicates the motion of the part 14b of the actuating rod 14 for expulsion of the retaining spring 11 from the cladding tube 2 of the replacement rod. During this motion of the part 14b, the tongue springs 18, which are secured with their ends facing in the direction of movement of the arrow 60 on the part 14b of the actuating rod 14, finally protrude with their other ends from the sheath 21 and spread the other ends to the outside. After relieving the pressure rod 46 of the actuating tube 35 and thus relieving the actuating rod 14 in the replacement rod as well, as shown in the left half of FIG. 9, the actuating rod 14 executes an opposite movement in the direction of an arrow 61 under the influence of the restoring spring 15, and finally the tongue springs 18 grip the sheath 21 in the replacement rod from behind, so that the expelled retaining spring 11 shown in FIGS. 7 and 8 locks in detent fashion in the position shown in FIGS. 7 and 8, and the replacement rod is retained in a force-locking manner in the gap in the spacer 32.

The retaining bracket 50 of the actuating tool 35 can then be released from the end cap 3 under the influence of the restoring spring 43, by rotating the union nut 44 in the opposite direction and moving the adjusting body 40 away, and it can be lifted to the side using a non-illustrated crane. Finally, after lifting off the centering plate 33 on the nuclear reactor fuel assembly 31 in the fuel assembly holder basket 30, a base piece can be put back in place and the fuel assembly 31 can be reinserted into a nuclear reactor, once it has been pivoted along with the holder basket 30 by 180° about an axis of rotation transverse to the longitudinal axis.

The replacement rod of FIGS. 1 and 2 can also be released from the gap shown in FIGS. 7 and 8 with the actuating tool 35 of FIG. 4 shown in the position of FIG. 6. To this end, the pressure rod 46 and the actuating rod 14 are displaced back toward the end cap 3 in the longitudinal direction so that the tongue springs 18 shown in a locked position in the left half of FIG. 9 are unlocked, and in accordance with the direction of motion represented by the arrow 62 in the left half of FIG. 10 are displaced into the clamping sheath 23, which is hindered by the sheath 22 during this process from executing any motion in the longitudinal direction of the cladding tube 2 of the replacement rod. After the relief of the pressure rod 46 and thus of the actuating rod 14, the actuating rod 14 is moved in the opposite direction, as indicated by the arrow 63 in the right half of FIG. 10, under the influence of the restoring spring 15 in the replacement rod. In this case the tongue springs 18 carry the clamping sheath 23 along with them, because of their radially outwardly directed spring tension. The motion of the clamping sheath 23 in the longitudinal direction of the cladding tube 2 is finally terminated by the sheath 21, so that the clamping sheath 23 is stripped off by the tongue springs 18, and the tongue springs 18 are displaced into the sheath 21, into the initial position shown in the right half of FIG. 9, in which the retaining spring 11 of the replacement rod has also been pushed back into the cladding tube 2.

The foregoing is a description corresponding in substance to German Application No. P 36 22 852.4, dated July 8, 1986, the International priority of which is being claimed for the instant application, and which is hereby made part of this application. Any material discrepancies between the foregoing specification and the aforementioned corresponding German application are to be resolved in favor of the latter.

We claim:

1. A replacement rod for replacing a fuel rod retained in a mesh formed in a lattice-like spacer of a nuclear reactor fuel assembly by means of a spring disposed in the mesh, comprising a cladding tube having a shell with an opening formed therein, a sliding body movable inside said cladding tube in two longitudinal directions of said cladding tube, slotted links disposed on said sliding body, a U-shaped retaining leaf spring having two ends, one of said ends of said retaining spring being fixed in the longitudinal direction at said cladding tube and each of said ends of said retaining spring being guided in a respective one of said slotted links, and at least a portion of said spring being displaced radially outwardly through said opening formed in said shell upon movement of said sliding body in one longitudinal direction of said cladding tube and being displaced radially inwardly upon movement of said sliding body in the other longitudinal direction of said cladding tube, and a locking device associated with said sliding body for holding said retaining spring radially outwardly so as to retain the replacement rod in the mesh formed in the spacer.

2. Replacement rod according to claim 1, wherein said cladding tube has a protruding locking shoulder on the inside thereof, and including an actuating rod with an outer shell surface displaceable inside said cladding tube for moving said sliding body, said locking device being in the form of a tongue spring with a given thickness and length disposed on said outer shell surface of said actuating rod, said tongue spring having two ends extending in the longitudinal direction of said actuating rod, one of said ends of said tongue spring facing in the direction of movement of said sliding body being secured on said actuating rod for expulsion of said retaining spring and the other of said ends of said tongue spring being spaced from said outer shell surface of said actuating rod for gripping said protruding locking shoulder from behind, a clamping sheath with a given length disposed inside said cladding tube, a protruding stop shoulder for said clamping sheath disposed inside said cladding tube and spaced apart from said locking shoulder by a given distance in the direction of movement of said sliding body for expulsion of said retaining spring, said clamping sheath being coaxially displaceable in the longitudinal direction of said cladding tube between said locking shoulder and said stop shoulder, said clamping sheath having an inner shell surface protruding beyond said locking shoulder in radial direction and being radially spaced apart from said actuating rod by a distance greater than said given thickness of said tongue spring, and said given distance between said locking shoulder and said stop shoulder being greater than the sum of said given length of said clamping sheath and said given length of said tongue spring in the longitudinal direction of said actuating rod.

* * * * *

UNITED STATES PATENT OFFICE
CERTIFICATE OF CORRECTION

PATENT NO. : 4,814,138
DATED : March 21, 1989
INVENTOR(S) : Fick et al

It is certified that error appears in the above-identified patent and that said Letters Patent is hereby corrected as shown below:

Column 8, Line 24 "one of said ends of said tongue spring facing in the direction of movement of said sliding body being secured on said actuating rod for expulsion of said retaining spring"

should read:

- - one of said ends of said tongue spring being secured on said actuating rod and facing in the direction of movement of said sliding body for expulsion of said retaining spring - - .

Signed and Sealed this

Eighteenth Day of February, 1992

Attest:

HARRY F. MANBECK, JR.

*Attesting Officer*     *Commissioner of Patents and Trademarks*